United States Patent [19]

Raad et al.

[11] Patent Number: 4,922,119
[45] Date of Patent: May 1, 1990

[54] INTEGRATED STARTING SYSTEM

[75] Inventors: Bernard A. Raad; Tyrone A. Johnsen, both of Rockford, Ill.

[73] Assignee: Sundstrand Corporation, Rockford, Ill.

[21] Appl. No.: 277,542

[22] Filed: Nov. 29, 1988

[51] Int. Cl.⁵ ............................................. F02N 11/04
[52] U.S. Cl. ................................. 290/31; 290/46; 322/10
[58] Field of Search ............ 290/22, 31, 36 R, 37 R, 290/38 R, 46; 322/10, 29

[56] References Cited

U.S. PATENT DOCUMENTS

| | | | |
|---|---|---|---|
| 2,519,580 | 8/1950 | Kittleson | 230/58 |
| 3,090,456 | 5/1968 | Blenkle | 180/10 |
| 3,132,595 | 5/1964 | Bower | 103/87 |
| 3,295,457 | 1/1967 | Oram | 103/118 |
| 3,514,221 | 6/1968 | Hasquenoph et al. | 417/206 |
| 3,672,793 | 6/1972 | Yowell | 417/368 |
| 3,823,620 | 7/1974 | Bricout | 74/675 |
| 4,278,928 | 7/1981 | Griffiths et al. | 322/29 |
| 4,330,743 | 5/1982 | Glennon | 290/46 X |
| 4,473,752 | 9/1984 | Cronin | 290/38 R |
| 4,481,459 | 11/1984 | Mehl et al. | 290/38 R X |
| 4,529,362 | 7/1985 | Ichiryu et al. | 417/271 |
| 4,606,707 | 8/1986 | Kumata | 417/354 |
| 4,743,776 | 5/1988 | Baehler et al. | 190/31 |
| 4,748,337 | 5/1983 | Raad et al. | 290/31 |

Primary Examiner—A. D. Pellinen
Assistant Examiner—W. E. Duncanson, Jr.
Attorney, Agent, or Firm—Antonelli, Terry & Wands

[57] ABSTRACT

A starting system for an aircraft propulsion engine. An electrical motor (62 or 122) is mounted within a case (14) in which first and second hydraulic units (102, 104) are operated as part of a constant speed drive transmission. The electric motor accelerates a motor-generator set (24) to a velocity near the synchronous speed. The motor-generator set is coupled to the drive shaft (20) by operation of the hydraulic units as a variable torque link. The electric motor functions both as a heat source of hydraulic fluid contained within the hydraulic pump and motor case during extreme low temperature conditions at which point the starting torque of the motor is initially insufficient to cause rotation of the output shaft and to further accelerate the motor-generator set up to a rotational velocity at which the motor-generator set may be operated synchronously at which the motor-generator set is coupled to the drive shaft (120) by operation of the hydraulic units as a variable torque link to rotate the engine. When the temperaature of the hydraulic fluid within the case is below the stall temperature so that the electric motor has insufficient starting torque to initiate rotation, the heat generated by the windings heats the hydraulic oil to lower its viscosity to a point at which rotation may be initiated to permit the motor-generator set to be rapidly accelerated to operate as a synchronous motor during starting.

17 Claims, 6 Drawing Sheets

INTEGRATED STARTING SYSTEM

TECHNICAL FIELD

The present invention relates to integrated starting and power generation systems for engines. More specifically, the present invention relates to an integrated starting and power generation system for an aircraft engine which transmits starting torque through a constant speed drive transmission used for driving a power generator from a variable speed shaft input from the aircraft engine.

BACKGROUND ART

Integrated electrical motors and pumps are known. These systems function to apply torque to a pump to supply power for driving the pump. See U.S. Pat. Nos. 2,519,580, 3,132,595, 3,295,457, 3,514,221, 3,672,793, 4,529,362 and 4,606,707. None of the aforementioned patents discloses a system used for starting engines.

Aircraft engines have been started by using an alternator which is used to generate aircraft power as a motor. For example, see U.S. Pat. No. 4,473,752. These systems operate the alternator as a synchronous motor or a brushless DC motor. These systems do not couple heat generated during starting by the windings of the motor-generator set to hydraulic fluid within a case containing a hydraulic pump-motor combination which is part of a conventional constant speed drive transmission in an aircraft power generation system. Use of the generator as a synchronous motor to start an aircraft engine requires a mechanism for accelerating the rotor of the generator close to synchronous speed such as an induction motor or brushless DC motor. If the starting torque produced by the induction or brushless DC motor to accelerate the generator to synchronous speed is applied through a constant speed drive transmission having a pair of conventional hydraulic units disposed in a case full of hydraulic fluid as described below, cold weather conditions can cause the hydraulic fluid to have high viscosity which prevents the development of sufficient starting torque. An induction or brushless DC motor having sufficient starting torque to accelerate a generator close to synchronous speed to use the generator as a synchronous motor to start an aircraft engine with the starting torque applied through a constant speed drive transmission having a hydraulic pump and motor immersed a full case of hydraulic fluid must be designed to produce sufficient torque to accelerate the hydraulic pump and motor under cold weather conditions at which the hydraulic fluid has a high viscosity prior to connecting the generator to the engine to be started by a torque link.

Figure 1:
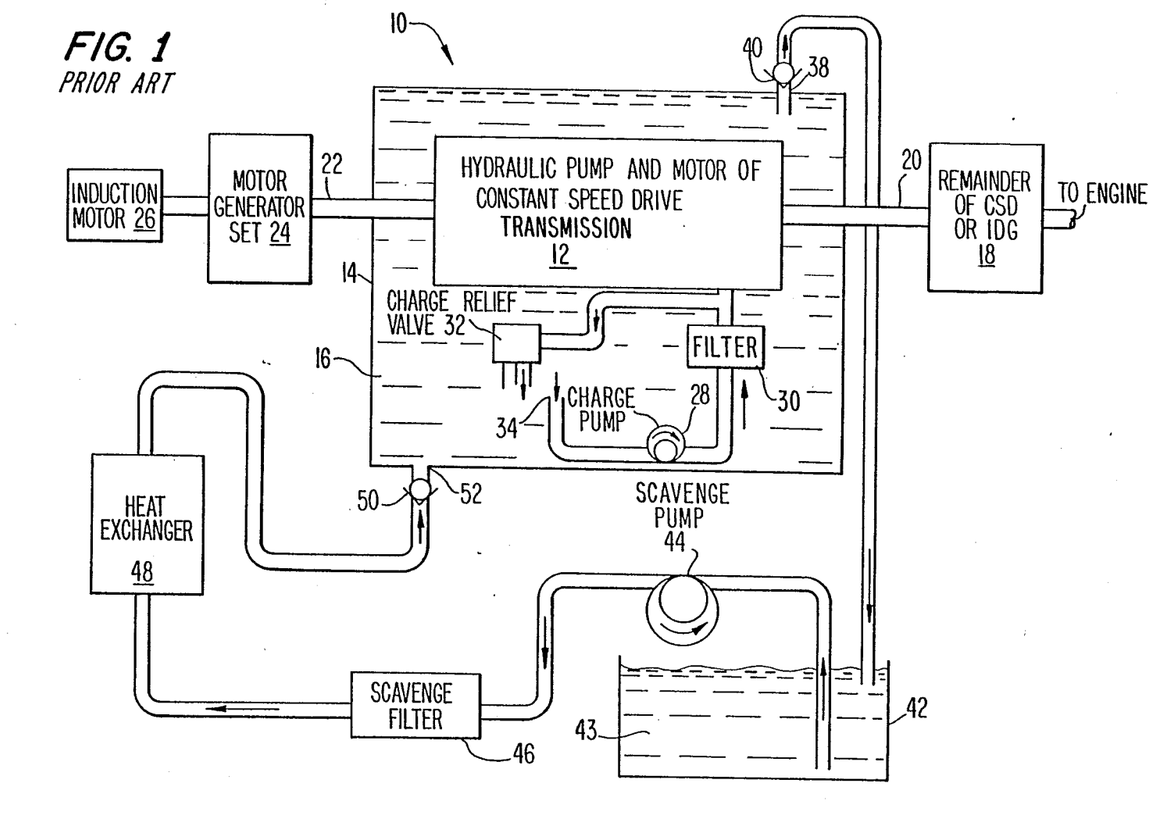
FIG. 1 is a block diagram of a prior art starting system for an aircraft propulsion engine.

FIG. 1 illustrates a block diagram of a prior art starting system for an aircraft engine utilizing a constant speed drive. This system relates generally to the type of system disclosed in U.S. Pat. No. 4,748,337 which is assigned to the assignee of the present invention. Patent application Ser. No. 112,701, filed Nov. 30, 1987, which is assigned to the assignee of the present invention, discloses a system for starting an engine with a hybrid permanent magnet induction motor which may be part of a brushless generator. The starting system 10 consists of a conventional constant speed drive (CSD) or an integrated drive generator (IDG) sold by the assignee of the present invention which includes a hydraulic pump and motor 12 combination which is disposed within a case 14 full of hydraulic fluid 16. As is well known, a CSD and an IDG function to provide a constant shaft speed applied to a three phase alternator from a variable speed shaft input from a power takeoff from an aircraft propulsion engine. The difference between an IDG and a CSD is that the IDG combines the generator and a constant speed drive transmission providing constant frequency electric power integrated in a single unit, while in a CSD the constant speed drive transmission is separated from the generator. The hydraulic pump and motor combination 12 is a conventional configuration. An aircraft engine (not illustrated) is rotationally coupled to the remainder of the CSD or IDG 18 may include a differential. The remainder of the CSD or IDG 18 is not illustrated for the reason that it is conventional and is not important in understanding the present invention. A driven shaft 20 is connected to the hydraulic pump and motor combination 12. The hydraulic pump and motor 12 combination has an output shaft 22 which is connected to a motor-generator set 24 which is a three phase alternator. Induction motor 26 is connected to the motor-generator set 24 to accelerate the motor-generator setup close to synchronous speed at which point the hydraulic pump and motor combination 12 is operated as a controlled variable torque link during which starting torque is progressively increased in magnitude from zero by the hydraulic pump and motor combination 12, and applied to the remainder of the CSD or IDG 18, which is connected to the aircraft engine to be started. The induction motor 26 is not intimately thermally coupled to the hydraulic fluid 16 within the case which prevents significant transfer of heat from the windings of the motor to the hydraulic fluid within the case during starting.

The full case 14 has a disadvantage that in cold weather conditions the viscosity of the hydraulic fluid 16 increases substantially with a change in viscosity occurring between 60° F. and −40° F. being from 200 centistokes to 13,000 centistokes. At cold temperatures, the viscosity of the fluid is so great that the starting torque of the induction motor 26 must be extremely high to cause initial rotation of the hydraulic pump and motor combination 12 to accelerate the motor-generator set close to synchronous speed so that motor/generator set 24 may be locked into synchronism and starting torque may be applied to the engine to be started. Furthermore, because of the nature of the full case 14, initial rotation of the aircraft engine produced by the remote induction motor 26 does not substantially heat the hydraulic fluid 16 within the case which makes it extremely difficult for the induction motor to rapidly accelerate the hydraulic pump and motor combination 12 close to synchronous velocity at which motor-generator set 24 may be operated as a synchronous motor to initiate rotation of the aircraft engine during starting through a variable torque link. In order to insure operation of the starting system to start an aircraft engine at low temperatures, it is necessary to size the induction motor 26 to have sufficient starting torque to initially rotate the hydraulic pump and motor combination 12 of the constant speed drive at temperature conditions which cause the aforementioned high viscosity of the hydraulic fluid 16 within the case 14. The sizing of the induction motor in this manner represents a weight penalty.

The case 14 typically contains a charge pump 28, filter 30 and charge relief valve 32 which function as follows. Hydraulic fluid 16 is taken in through intake 34 by charge pump 28 through filter 30 to the hydraulic unit in the hydraulic pump and motor combination 12 which is functioning as a pump. Any over pressure of the hydraulic fluid in the system is relieved by charge relief valve 32. As a result of the volume of the case, exposure of the case to cold weather conditions creates a volume of chilled hydraulic fluid of high viscosity which will place immediate drag on the hydraulic pump and motor combination 12 and which must be warmed to reduce the aforementioned drag.

During normal operation the hydraulic fluid circuit external of the case functions as follows. Hydraulic fluid flows from output port 38 through check valve 40 into external sump 42. Hydraulic fluid 43 within the external sump 42 is pumped by scavenge pump 44 through scavenge filter 46 to heat exchanger 48. The heat exchanger functions to cool the hydraulic fluid which is then discharged into the case through check valve 50 at input port 52.

DISCLOSURE OF INVENTION

The present invention provides an improved starting system for an engine, such as an aircraft engine, which utilizes a constant speed drive transmission as a variable torque link with the hydraulic pump -motor located within a case full of hydraulic fluid for applying starting torque from a motor-generator set to the aircraft engine. The invention overcomes problems consequent from high viscosity hydraulic fluid within a case containing hydraulic pump and motor units of the constant speed drive transmission during cold weather by utilizing an electric motor contained within the case, to apply starting torque to accelerate the motor-generator set to a rotational velocity close to synchronous velocity, at which the motor-generator set may operate as a synchronous motor during operation of the CSD with a hydraulic pump and motor as a variable torque link for accelerating the engine to be started.

The motor within the case performs two functions during cold weather starting. Its first function is to initially heat the hydraulic fluid within the case to a temperature which lowers its viscosity to a level at which the starting torque of the electric motor overcomes the viscous drag, on the hydraulic unit within the case which functions as a pump during starting, caused by the cold hydraulic fluid and initiates rotation of the motor-generator set and hydraulic unit which functions as a pump during starting within the case. Second, the motor accelerates the motor-generator set and the hydraulic unit which functions as a pump during starting within the case up to a rotational velocity close to the synchronous velocity of the motor-generator set at which point the motor-generator set may be operated as a synchronous motor to initiate application of starting torque to the aircraft engine by operation of the hydraulic pump and motor within the CSD as a variable torque link to accelerate the engine to be started. By utilizing the induction motor within the case as a heating unit, the size of the motor may be reduced over that which would be necessary to supply initial torque to overcome the high viscosity of hydraulic fluid within the case with an electric motor disposed outside of the case. The aforementioned sizing represents a weight savings in the aircraft over the prior art. With the invention, starting of an aircraft propulsion engine is possible with a constant speed drive transmission utilized for electrical power generation in which the hydraulic units are immersed in a full case of hydraulic fluid (MIL-L-23699 at −40° F.) or (MIL-L-7808 at −65° F.) exhibit a viscosity of 13,000 centistokes.

The invention has the following advantages. In the first place, it minimizes the size of the motor required to supply torque to accelerate the motor-generator set and the hydraulic unit which functions as a pump during starting within the constant speed drive transmission up to a velocity close to the synchronous speed of the motor-generator set. Furthermore, it lessens the initial torque required to be developed by the electric motor as a consequence of the motor not being required to produce torque sufficient, prior to heating of the hydraulic fluid within the case, to initially rotate the motor-generator set and hydraulic unit which functions as a pump during starting in the presence of cold hydraulic fluid within the hydraulic pump-motor case. The invention further minimizes the number of parts required for starting of the aircraft propulsion engine and further the physical size of the starting system when the electric motor is disposed inside the case of hydraulic fluid containing the hydraulic units and is concentric with the hydraulic units. Finally, the invention reduces the stress placed on components during starting and further reduces the time required to accelerate the motor-generator set and the hydraulic unit which functions as a pump within the constant speed drive transmission close to a velocity at which the motor-generator set may be operated synchronously to apply starting torque to the aircraft propulsion engine through the CSD operated as a variable torque link.

A system for starting an engine in accordance with the invention comprises a constant speed drive transmission having drive shaft coupled to the engine with the drive shaft coupled to a first hydraulic unit and an output shaft connected to a second hydraulic unit with the output shaft being coupled to a motor-generator set, the output shaft being driven at a constant rotational velocity during generation of electrical power and the drive shaft being driven during starting of the aircraft engine, the first hydraulic unit functioning as a hydraulic pump and the second hydraulic unit functioning as a hydraulic motor during generation of electrical power and the first hydraulic unit functioning as a hydraulic motor and the second hydraulic unit functioning as a hydraulic pump during starting of the engine; the hydraulic units being disposed within a case which is full of hydraulic fluid during operation; an electric motor disposed within the case having a rotor coupled to at least the output shaft and a stator for applying torque to the rotor; the electric motor having a stall torque which may be insufficient to rotate the output shaft initially during starting of the engine when the hydraulic fluid in the case has a temperature below a stall temperature, the electric motor during stall of the rotor caused by the high viscosity of the hydraulic fluid at low temperatures within the case transferring heat to the hydraulic fluid to lower viscosity of the hydraulic fluid to a level at which torque developed by the electric motor is sufficient to initiate rotation of the output shaft with the connected hydraulic unit and motor-generator set and accelerate it close to a rotational velocity at which the motor-generator set may be operated as a synchronous motor to apply torque through the constant speed drive transmission to the drive shaft for starting the engine.

A number of implementations of the electric motor within the case are within the scope of the invention with the following examples being merely exemplary. The electric motor may be coupled to the output shaft by a rotor of the electric motor being connected to the output shaft. The electric motor may be coupled to the output shaft by a rotor of the motor being connected to the second hydraulic unit. The electric motor may be coupled to the output shaft by a rotor having first and second sections, the first section being coupled to the drive shaft by connection to the first hydraulic unit and the second section being coupled to the output shaft by connection to the second hydraulic unit with the first and second sections being movable with respect to each other and a stator which is concentric to the first and second sections. The electric motor may be coupled to the output shaft by connection to a cylinder block of the second hydraulic unit. The rotor and cylinder block of the second hydraulic unit may be a unitary structure. Preferably, the electric motor is an induction motor or a brushless DC motor.

The terminology integrated drive generator (IDG) describes a CSD transmission which is integral with a generator within a single case.

A system in accordance with the invention includes a constant speed drive transmission having a drive shaft for connection to a source of power with the drive shaft connected to a first hydraulic unit and an output shaft connected to a second hydraulic unit with the output shaft being coupled to a source for applying driving torque to the drive shaft through the constant speed drive transmission, the first hydraulic unit functioning as a hydraulic pump and the second hydraulic unit functioning as a hydraulic motor when torque is applied to the drive shaft by the source of power and the first hydraulic unit functioning as a hydraulic motor and the second hydraulic unit functioning as a hydraulic pump when torque is applied by the synchronous motor for applying driving torque; the hydraulic units being disposed within a case which is full of hydraulic fluid during operation; an electric motor disposed within the case having a rotor coupled to at least the output shaft and a stator for applying torque to the rotor; the electric motor having a stall torque which may be insufficient to rotate the output shaft initially when the hydraulic fluid in the case has a temperature below a stall temperature, the electric motor during stall of the rotor caused by hydraulic fluid temperature transferring heat to the hydraulic fluid to lower the viscosity of the hydraulic fluid to a level at which torque developed by the electric motor is sufficient to initiate rotation of the output shaft and source for applying driving torque and accelerate the output shaft and source for applying driving torque close to a rotational velocity at which the source of applying driving torque may be operated to apply torque by rotation through the constant speed drive transmission to the drive shaft.

BEST MODE FOR CARRYING OUT THE INVENTION

Figure 2:
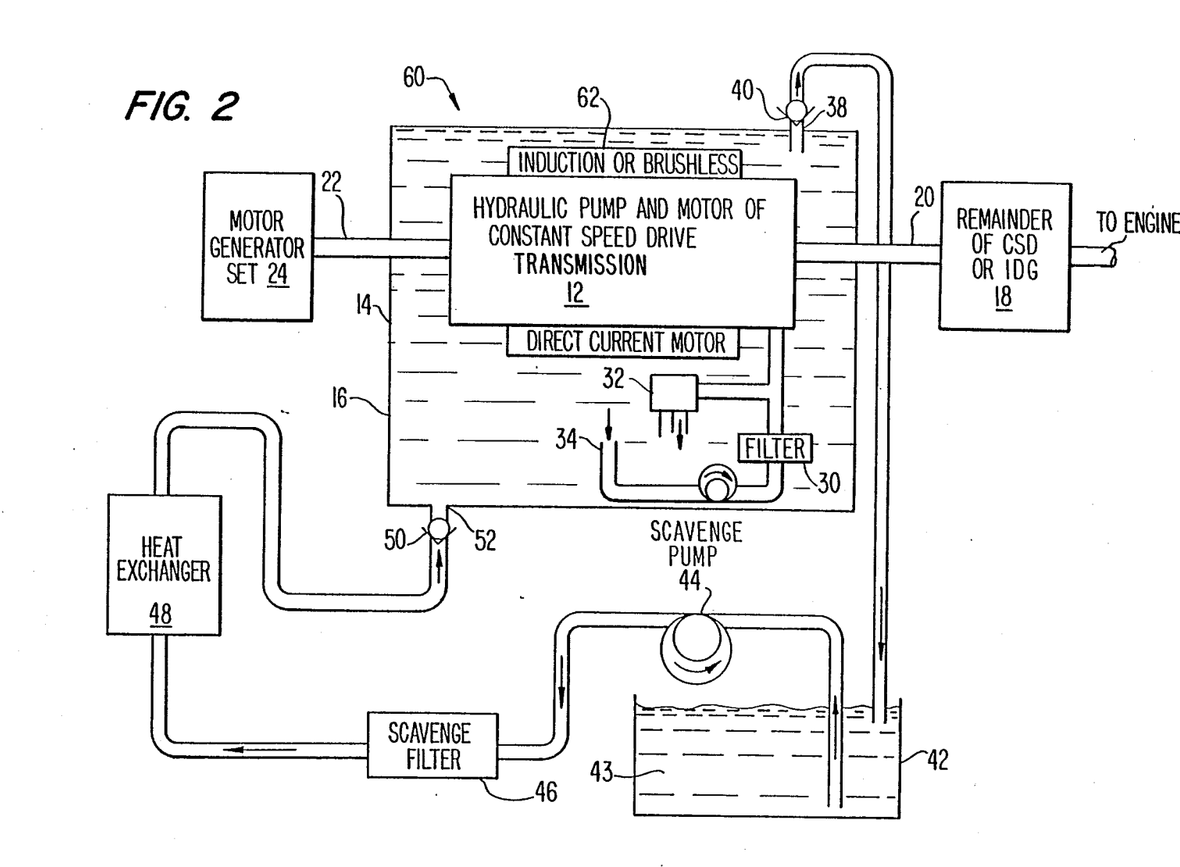
FIG. 2 is a schematic of a preferred embodiment of the present invention.

FIG. 2 illustrates a schematic of a preferred embodiment 60 of the present invention. The hydraulic fluid flow circuits both within the case 14 and outside of the case are identical to those described above with respect to FIG. 1 and will hereinafter not be further described for the reason that they form no part of the present invention. Furthermore, the operation of the motor-generator set 24 in generating electrical power upon the application of torque to the constant speed drive transmission by the propulsion engine of an aircraft is identical to that described above with reference to FIG. 1. A brushless DC or induction motor 62 is disposed within the case 14, concentric with a second hydraulic unit or concentric with both first and second hydraulic units as described below, which functions as a zero rotational high efficiency heating source of the hydraulic fluid 16 within the case to lower the viscosity of the fluid when initially, prior to heating, the viscosity of the fluid is so great as a consequence of the hydraulic fluid being below a stall temperature at which the starting torque of the induction or brushless DC motor 62 is insufficient to initiate rotation of the shaft 22 of the motor-generator set 24. The stall temperature is a function of at least the nature of the hydraulic fluid, the design of the hydraulic units in the constant speed drive transmission and the size of the electric motor. Furthermore, the induction or brushless DC motor 62 functions to accelerate the motor-generator set 24 and second hydraulic unit to a velocity close to the synchronous speed of the motor-generator set at which the motor-generator set may be operated as a synchronous motor to initiate rotation of the engine during starting by operation of the CSD with a hydraulic pump and motor 12 as a variable torque link. The combined functions of the induction or brushless direct current motor 62 as a heater and to accelerate the motor-generator set 24 close to its synchronous speed permits rapid starting of the aircraft engine under conditions of extreme cold without requiring sizing of the brushless or induction motor to deliver a starting torque sufficiently great to initially overcome the drag of the hydraulic fluid 16 within the case 14 on the first and second hydraulic units during conditions of extreme cold below the stall temperature. The reduction in size results in a weight savings which is of great importance to aircraft. The configuration 62 of the induction or brushless direct current motor concentric with the second or both the first and second hydraulic units of the hydraulic pump and motor combination 12 is preferred for the reason that the axial dimension of the case 14 with respect to the drive shaft 20 and the output shaft 22 is minimized. The induction or brushless direct current motor 62 may be connected to a cylinder block of the second hydraulic unit as will be described below in detail.

Figure 3:
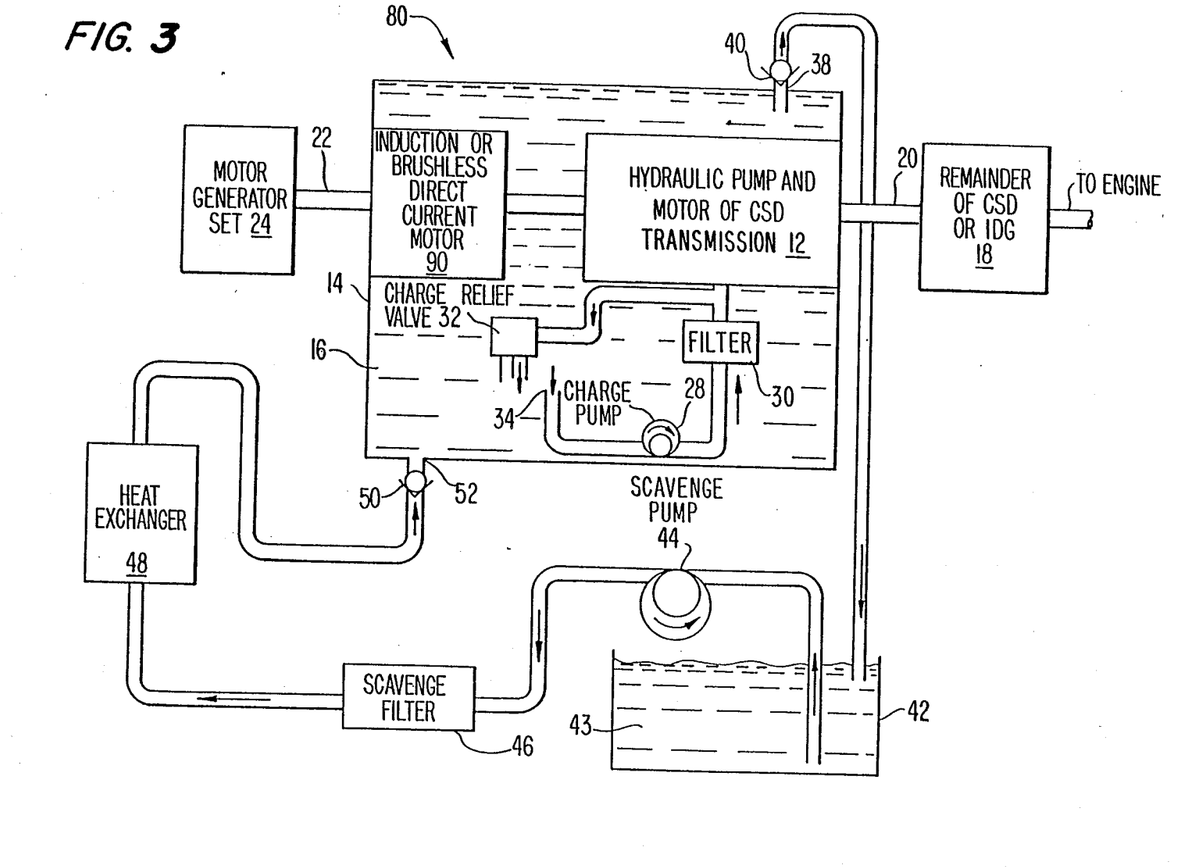
FIG. 3 is a block diagram of a second embodiment of the present invention.

FIG. 3 illustrates an alternative embodiment which functions in a manner identical to the embodiment 60 illustrated above with regard to FIG. 2. The embodiment of FIG. 3 differs only in that the induction or brushless direct current motor 90 is not mounted concentric with the hydraulic pump and motor combination 12 of the CSD or IDG. A disadvantage of the embodiment of FIG. 3 is that the axial dimension of the case 14 is lengthened as a result of the induction or brushless direct current motor 90 being joined to the output shaft 22 instead of concentric with the hydraulic pump and motor combination 12. Otherwise, the operation of the embodiment in FIG. 3 is identical to that of FIG. 1.

Figure 4:
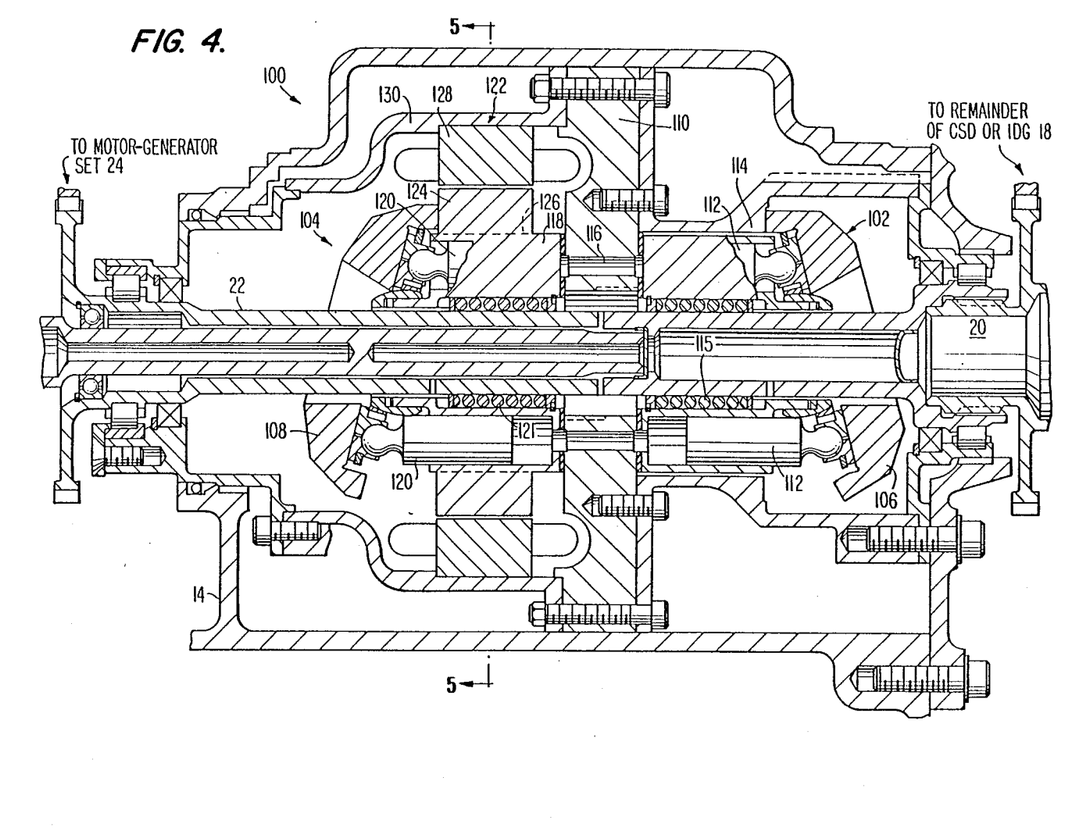
FIG. 4 is a sectional view of a preferred embodiment of the present invention.

FIG. 4 illustrates a sectional view of a preferred embodiment 100 of the present invention. Hydraulic fluid 16 has been omitted from the interior of the case 14 to simplify the illustration with it being understood that the case is full of hydraulic fluid during normal operation. The embodiment 100 contains a first hydraulic unit 102 and a second hydraulic unit 104 which each function as either a hydraulic pump or hydraulic motor depending upon the mode of operation of the embodiment in generating electrical power or starting an aircraft engine as described below. As illustrated, the first hydraulic unit 102 has a variable wobbler plate 106 and the second hydraulic unit 104 has a variable wobbler plate 108. A wobbler plate is conventionally used in constant speed drive transmissions to vary displacement of a hydraulic pump. During electrical power generation, the angle of the variable wobbler plate 106 is varied between zero and maximum stroke to apply torque from the engine to maintain the motor-generator set 24 unit at the desired operating speed. During starting, after the motor-generator set is rotating at least near synchronous speed, the angles of wobbler plate 106 and 108 are varied between zero to maximum stroke to function as a variable torque link to accelerate the engine to self-sustaining speed. The angle of the variable wobbler plates 106 and 108 are controlled by conventional servo valves (not illustrated) to change the displacement of the units respectively during power generation and starting. The hydraulic units 102 and 104 are connected by a stationary port plate 110 of conventional construction. Springs 115 and 121 are conventional.

During operation of the embodiment 100 to generate electrical power, the hydraulic units 102 and 104 operate as follows. Input torque applied from the engine (not illustrated) is applied to drive shaft 20 which causes rotation of the cylinder block 114. Rotation of the cylinder block 114 causes pistons 112 to reciprocate within cylinders as a function of the wobbler plate 106 angle. Pressurized hydraulic fluid is forced through the ports 116 of the stationary port plate 110 into cylinders of cylinder block 118 which causes pistons 120 to reciprocate which produces rotation of the cylinder block 118. Torque is applied from the cylinder block 118 to output shaft 22 which is coupled to the motor-generator set 24 to cause the generation of three phase constant frequency current. In a preferred form of the invention, the motor-generator set is used to generate 400 Hz electrical power used in aircraft with the rotational velocity of the output shaft 22 being constant which is the function performed by a conventional CSD or IDG. Other conventional structures in a full case CSD or IDG pertaining to the hydraulic units 102 and 104 are not discussed for the reason that they do not form part of the present invention.

An induction or brushless direct current motor 122 is mounted coaxial with the second hydraulic unit 104. Electrical connections to the stator have been omitted for purposes of clarity in the drawings. Rotor 124 is joined to cylinder block 118 by a mechanical connection (not illustrated). The dotted line 126 illustrates the point of juncture of the rotor 124 with the cylinder block 118. Alternatively, the cylinder block 118 and rotor 124 may be an integral structure. Stator 128 applies a rotating magnetic field to the rotor 124. The stator 128 is supported by stator support 130 which is joined to the exterior walls of the case 14. During operation of the embodiment 100 to generate electrical power, there is no field current applied to the stator 128 which does not load the rotor 124 to provide freewheeling of the rotor without substantial drag from the stator.

Figure 5:
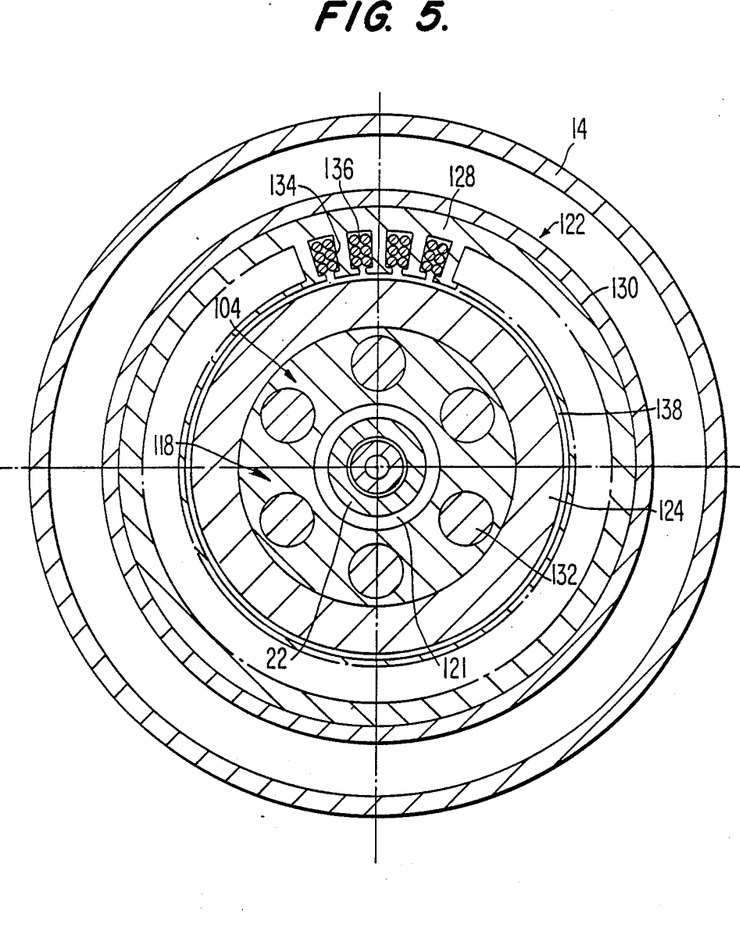
FIG. 5 is a cross-sectional view of FIG. 4.

FIG. 5 illustrates a sectional view of the embodiment of FIG. 4 taken along section line 5—5. Like reference numerals identify like parts in FIGS. 4 and 5. A plurality of cylinders 132 are contained within the cylinder block 118. Stator 128 contains a plurality of slots 134 within which windings 136 are wrapped in a conventional fashion to form a plurality of pairs of poles in a conventional manner. Gap 138 separates the stator 128 from the rotor 124. It should be understood that the sectional view of FIG. 5 illustrates a possible implementation of the hydraulic unit 104 used with the present invention with other conventional implementations of hydraulic units being usable in practicing the present invention.

Figure 6:
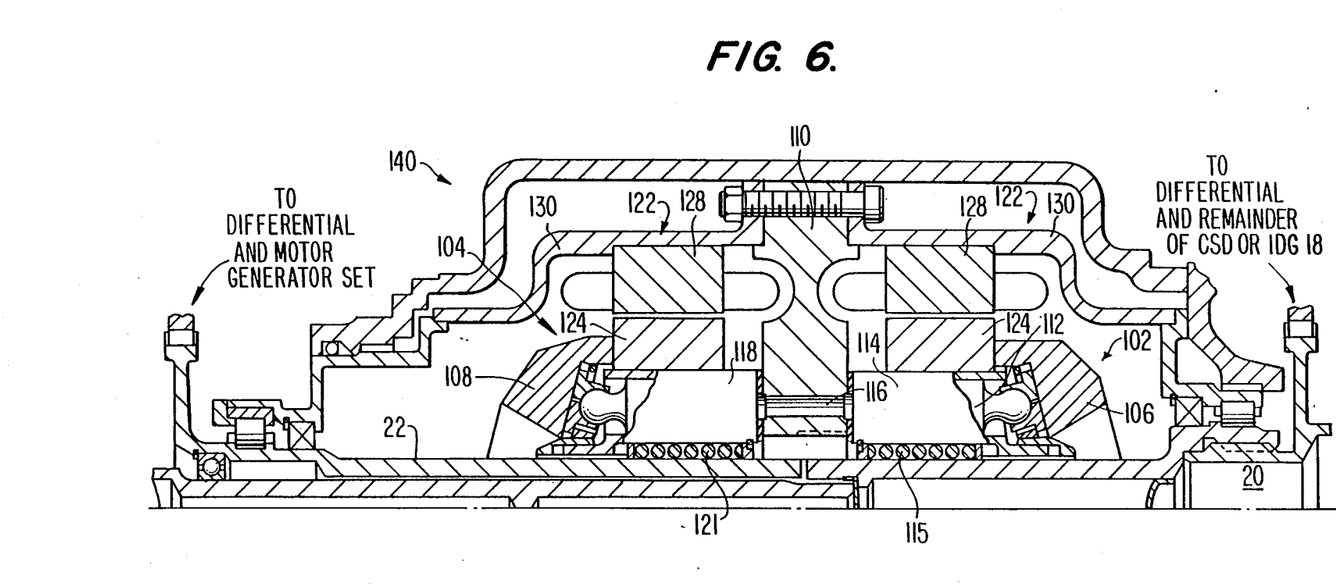
FIG. 6 fragmentary view of a second preferred embodiment of the present invention.

FIG. 6 illustrates another embodiment 140 of the present invention with only one-half of the embodiment above an axial centerline being illustrated to simplify the illustration with it being understood that the omitted half is identical to the illustrated half. Like reference numerals identify like parts in FIGS. 4 and 6. The embodiment 140 of FIG. 6 differs from the embodiment 100 of FIG. 5 in that the induction or brushless DC motor 122 is connected to both the first and second hydraulic units 102 and 104. First and second rotors 124 are connected to the cylinder blocks 114 and 118 of the first and second hydraulic units 102 and 104 respectively. The cylinder blocks are rotational relative to each other. The rotors 124 may be an integral part of the cylinder blocks or mechanically joined as indicated by dotted line 126 described above with reference to FIG. 4. The stator 128 is an integral structure with the fixed port plate 110 and functions to apply driving torque to each of the rotors 124. The embodiment of FIG. 6 functions as a more efficient heating source of the hydraulic fluid within the case in that the right-hand rotor 124 is continually stalled during acceleration of the motor-generator set 26 close to synchronous velocity as a result of the rotor being joined to the cylinder block 114 which is coupled to the remainder of the CSD 18 or IDG that is connected to the engine with the engine being stalled prior to operation of the hydraulic units 102 and 104 as a variable torque link.

Operation of the embodiments in FIGS. 4–6 to apply starting torque to an aircraft engine (not illustrated) is as follows. When the output shaft 22 is stationary, the motor-generator set 24 does not develop starting torque. The initial starting torque to accelerate the motor-generator set 24 is applied by the induction or brushless DC motor 122. If the temperature of the hydraulic fluid within the case 14 is not below the stall temperature so as to prevent the electric motor 122 from instantaneously rotating the output shaft 22 at the time of applying power to the electric motor, acceleration of the motor-generator set up to close to the synchronous speed will be initiated immediately through the rotor 124 attached to the second hydraulic unit 104. The output shaft 22 is accelerated by the induction or brushless DC motor 122 up to a rotational velocity close to which point the motor-generator set 24 may be operated as a synchronous motor. Thereafter, starting torque is progressively linked from the motor-generator set to the engine to be started to accelerate the engine by operation of the second unit 104 and the first unit 102 as a variable torque link by variation of the wobbler plate 108. In conditions involving extreme cold below the stall temperature, such as −40° F., the viscosity of the hydraulic fluid within the case 14 is so high that the stall torque of the induction or brushless DC motor 122 is insufficient instantaneously to overcome the viscous drag of the hydraulic fluid within the case on the hydraulic units 102 and 104 to cause rotation of the output shaft 22 to initiate acceleration of the motor-generator set up to synchronous velocity to the engine by progressively varying the wobbler plate 108 of the unit 104 from zero to its maximum stroke. The application of current to the stator 128 when the rotor 124 is stalled causes the motor 122 to function purely as a heating unit of the hydraulic fluid within the full case with zero rotational efficiency. Heat energy is transferred from the windings of the motor to the hydraulic fluid within the case to cause its viscosity to rapidly drop to a point at which the stall torque of the motor 122 is sufficient to cause the output shaft 22 to initiate acceleration of the motor-generator set to a velocity close to the synchronous velocity. During acceleration of the output shaft 22 and motor-generator set 24 in conditions involving extreme cold, the electrical motor 122 continues to transfer heat energy to the hydraulic fluid within the case 14 from the windings to cause a rapid drop in the viscosity of the hydraulic fluid to continue to substantially lower the drag on the hydraulic unit 104 to permit rapid acceleration up to a rotational velocity at which the motor-generator set 24 may be operated synchronously to initiate operation of the hydraulic units 104 and 102 as a variable torque link by progressively varying the angle of the variable swash plate 108 from zero stroke to a maximum stroke to initiate rotation of the aircraft engine during starting.

While the invention has been described in terms of its preferred embodiments, it should be understood that numerous modifications may be made thereto without departing from the spirit and scope of the invention as defined in the appended claims. For example, it should be understood that the invention is not limited to any particular type of electrical motor with an induction or brushless DC motor merely being the preferred type of motor which may be utilized. Furthermore, the invention is useful in full case systems containing hydraulic units requiring rapid acceleration by an electric motor applying torque to assist rotation of the hydraulic units within a full case of hydraulic fluid in applications where weight should be minimized such as in aircraft.

We claim:

1. A system for starting an engine comprising:
   a constant speed drive transmission having a drive shaft for connection to the engine with the drive shaft being coupled to a first hydraulic unit and an output shaft being coupled to a second hydraulic unit with the output shaft being coupled to a motor-generator set, the output shaft being driven at a constant rotational velocity during the generation of electrical power and the drive shaft being driven during starting of the engine, the first hydraulic unit functioning as a hydraulic pump and the second hydraulic unit functioning as a hydraulic motor during generation of electrical power and the first hydraulic unit functioning as a hydraulic motor and the second hydraulic unit functioning as a hydraulic pump during starting of the engine;
   the hydraulic units being disposed within a case which is full of hydraulic fluid during operation;
   an electric motor disposed within the case having a rotor coupled to at least the output shaft and a stator for applying torque to the rotor;
   the electric motor having a stall torque which is insufficient to rotate the output shaft initially during starting of the engine when the hydraulic fluid in the case has a temperature below a stall temperature, the electric motor during stall of the rotor caused by hydraulic fluid temperature within the case transferring heat to the hydraulic fluid to lower viscosity of the hydraulic fluid to a level at which torque developed by the electric motor is sufficient to initiate rotation of the output shaft and the motor-generator set and accelerate the output shaft and motor-generator set to a rotational velocity at which the motor-generator set may be operated as a synchronous motor to apply torque through the constant speed drive transmission to the drive shaft for starting the engine.

2. A system for starting an engine in accordance with claim 1 wherein:
   the electric motor is coupled to the drive shaft by a rotor of the motor being connected to the output shaft.

3. A system for starting an engine in accordance with claim 1 wherein:
   the electric motor is coupled to the output shaft by a rotor of the motor being connected to the second hydraulic unit.

4. A system for starting an engine in accordance with claim 1 wherein:
   the electric motor is coupled to the drive shaft by a rotor having first and second sections, the first section being coupled to the drive shaft through a differential within the constant speed drive transmission by connection to the first hydraulic unit and the second section being coupled to the output shaft with the first and second sections being movable with respect to each other and a stator which is concentric to the first and second sections.

5. A system for starting an engine in accordance with claim 3 wherein:
   the electric motor is coupled to the drive shaft by connection to a cylinder block of the second hydraulic unit.

6. A system for starting an engine in accordance with claim 5 wherein:
   the rotor and cylinder block of the second hydraulic unit are a unitary structure.

7. A system for starting an engine in accordance with claim 1 wherein:
   the engine is an aircraft propulsion engine.

8. A system for starting an engine in accordance with claim 1 wherein:
   the electric motor is an induction motor.

9. A system for starting an engine in accordance with claim 1 wherein:
   the electric motor is a brushless DC motor.

10. A system comprising:
    a constant speed drive transmission having a drive shaft for connection to a source of power with the drive shaft being coupled to a first hydraulic unit and an output shaft being coupled to a second hydraulic unit with the output shaft being coupled to a source for applying driving torque to the drive shaft through the constant speed drive transmission, the first hydraulic unit functioning as a hydraulic pump and the second hydraulic unit functioning as a hydraulic motor when torque is applied to the drive shaft by the source of power and the first hydraulic unit functioning as a hydraulic motor and the second hydraulic unit functioning as a hydraulic pump when torque is applied by the source for applying driving torque;

the hydraulic units being disposed within a case which is full of hydraulic fluid during operation;

an electric motor disposed within the case having a rotor coupled to at least the output shaft and a stator for applying torque to the rotor during operation;

the electric motor having a stall torque which is insufficient to rotate the output shaft initially when the hydraulic fluid in the case has a temperature below a stall temperature, the electric motor during stall of the rotor caused by hydraulic fluid temperature within the case transferring heat to the hydraulic fluid to lower viscosity of the hydraulic fluid to a level at which torque developed by the electric motor is sufficient to initiate rotation of the output shaft and source of applying driving torque and accelerate the output shaft and source of driving torque to a rotational velocity at which the source of applying driving torque may be operated to apply torque by rotation through the constant speed drive transmission to the drive shaft and source of power.

11. A system in accordance with claim 10 wherein:
the electric motor is coupled to the output shaft by a rotor of the motor being connected to the output shaft.

12. A system in accordance with claim 10 wherein:
the electric motor is coupled to the output shaft by a rotor of the motor being connected to the second hydraulic unit.

13. A system in accordance with claim 10 wherein:
the electric motor is coupled to the output shaft by a rotor having first and second sections, the first section being coupled to the drive shaft through a differential within the constant speed drive transmission by connection to the first hydraulic unit and the second section being coupled to the output shaft with the first and second sections being movable with respect to each other and a stator which is concentric to the first and second sections.

14. A system in accordance with claim 13 wherein:
the electric motor is coupled to the output shaft by connection to a cylinder block of the second hydraulic unit.

15. A system for starting an engine in accordance with claim 14 wherein:
the rotor and cylinder block of the second hydraulic unit are a unitary structure.

16. A system in accordance with claim 10 wherein:
the electric motor is an induction motor.

17. A system in accordance with claim 10 wherein:
the electric motor is a brushless DC motor.

* * * * *